United States Patent
Cato et al.

(10) Patent No.: US 9,047,521 B2
(45) Date of Patent: Jun. 2, 2015

(54) DIAGNOSING A MAGNETIC READER

(75) Inventors: Robert Thomas Cato, Raleigh, NC (US); Phuc Ky Do, Morrisville, NC (US); Justin Monroe Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2176 days.

(21) Appl. No.: 11/560,222

(22) Filed: Nov. 15, 2006

(65) Prior Publication Data

US 2008/0110987 A1 May 15, 2008

(51) Int. Cl.
 *G06K 7/08* (2006.01)
 *G06K 19/12* (2006.01)
 *G06K 7/00* (2006.01)

(52) U.S. Cl.
 CPC .............. *G06K 7/084* (2013.01); *G06K 7/0095* (2013.01)

(58) Field of Classification Search
 USPC ............... 235/493; 324/202, 205, 207.2, 210; 360/21
 See application file for complete search history.

(56) References Cited

U.S. PATENT DOCUMENTS

| | | | | |
|---|---|---|---|---|
| 3,706,926 A | * | 12/1972 | Barrager et al. | 324/210 |
| 5,337,122 A | * | 8/1994 | Hubble et al. | 399/49 |
| 5,613,783 A | | 3/1997 | Kinney et al. | |
| 5,861,614 A | * | 1/1999 | Gardner | 235/379 |
| 6,278,565 B1 | * | 8/2001 | Yoon | |
| 6,445,519 B1 | * | 9/2002 | Weinstein et al. | 360/25 |
| 2003/0174562 A1 | * | 9/2003 | Kawaguchi et al. | 365/200 |
| 2003/0233557 A1 | | 12/2003 | Zimmerman | |
| 2003/0234646 A1 | * | 12/2003 | Patland et al. | 324/210 |
| 2004/0036471 A1 | * | 2/2004 | Mackay et al. | 324/210 |
| 2004/0056091 A1 | * | 3/2004 | Overhultz et al. | 235/382 |
| 2005/0006468 A1 | * | 1/2005 | Fandel et al. | 235/383 |
| 2006/0193080 A1 | * | 8/2006 | Chattopadhyay et al. | |

* cited by examiner

*Primary Examiner* — Daniel Hess
(74) *Attorney, Agent, or Firm* — Yee & Associates, P.C.; James Nock

(57) ABSTRACT

A computer implemented method for diagnosing a magnetic reader subassembly. A processor generates a test signal during a diagnostic period. The processor then receives a return signal from the magnetic reader subassembly. The processor then compares the test signal and the return signal and diagnoses an operational status of the magnetic reader subassembly in response to the comparison of the test signal and the return signal.

20 Claims, 5 Drawing Sheets

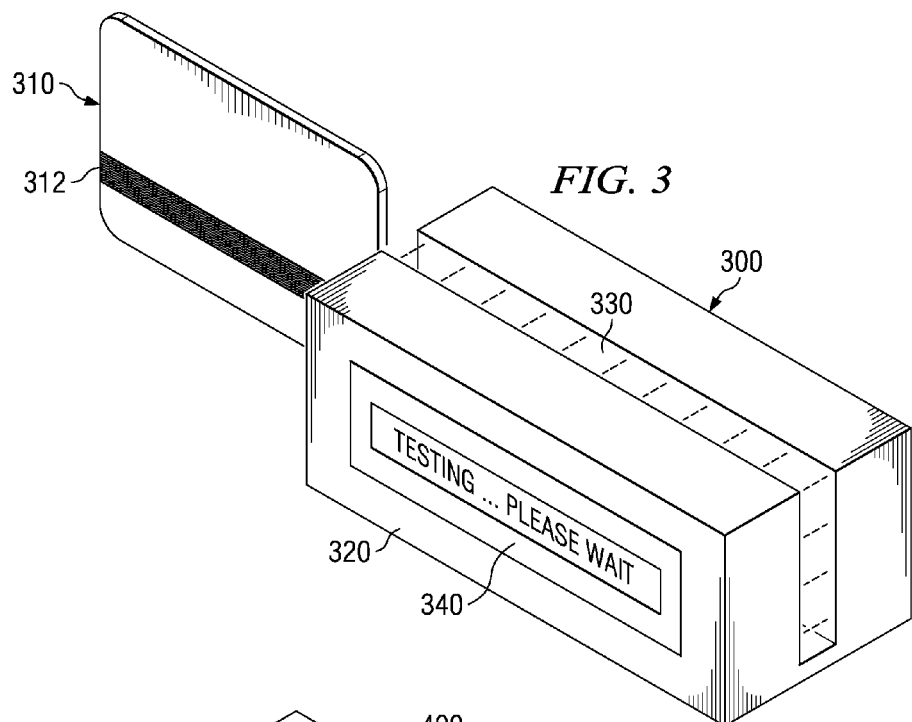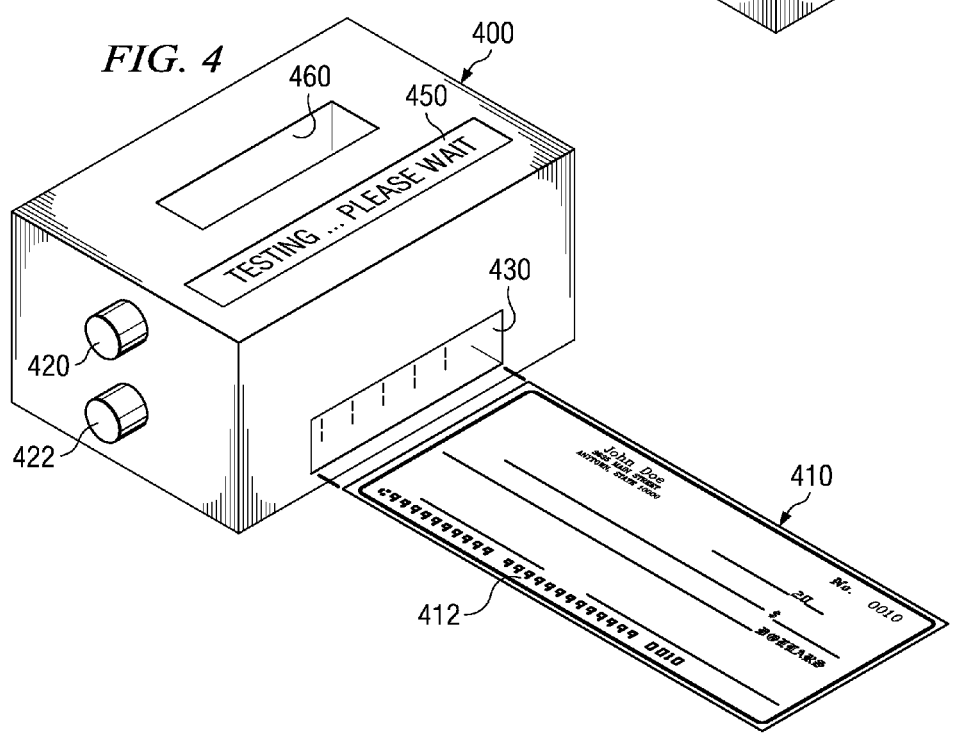

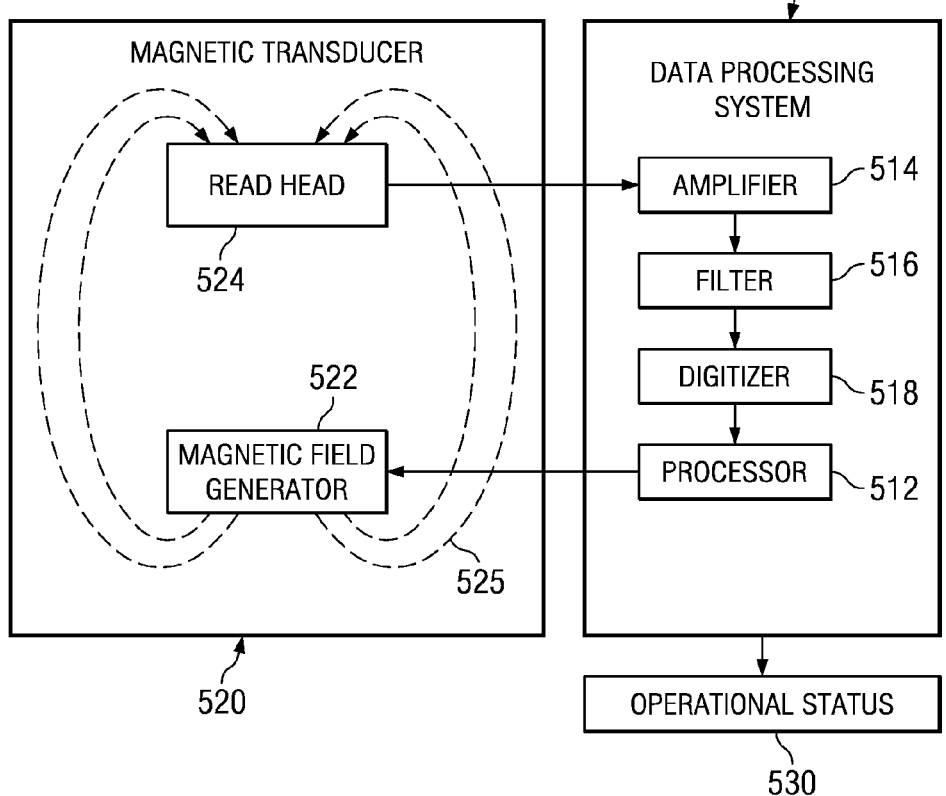

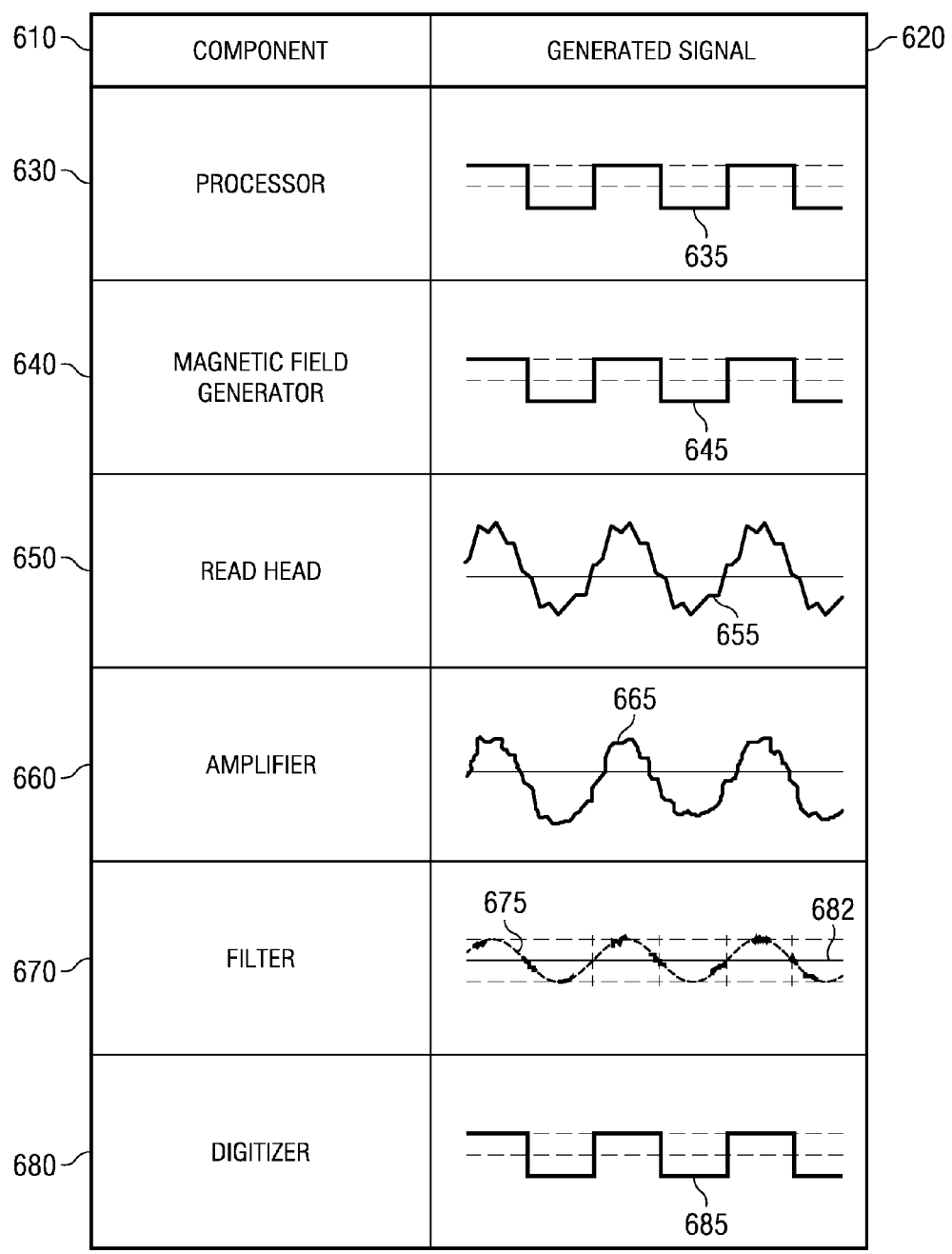

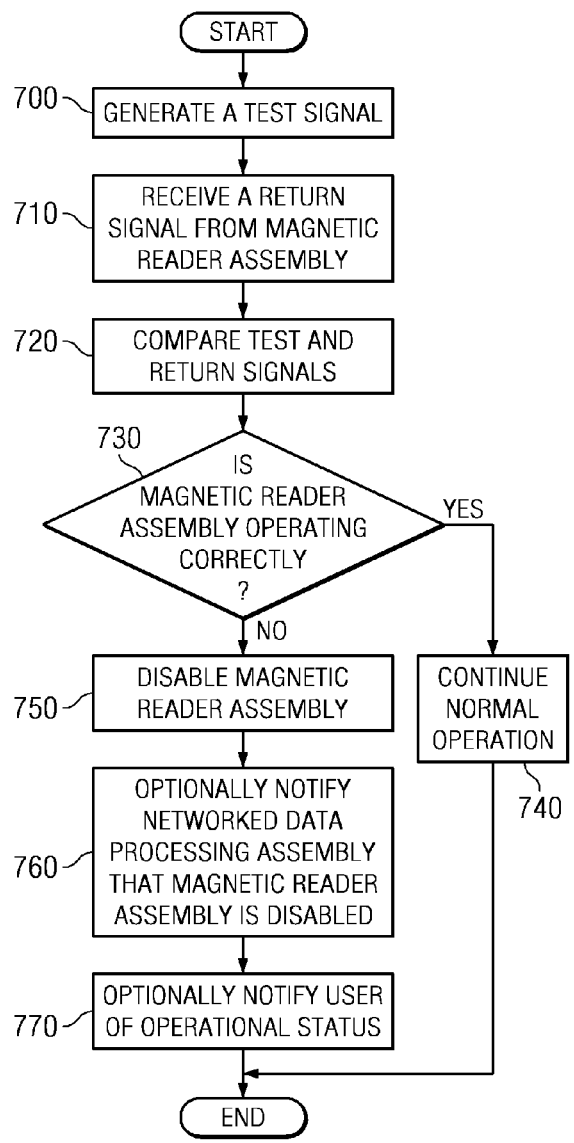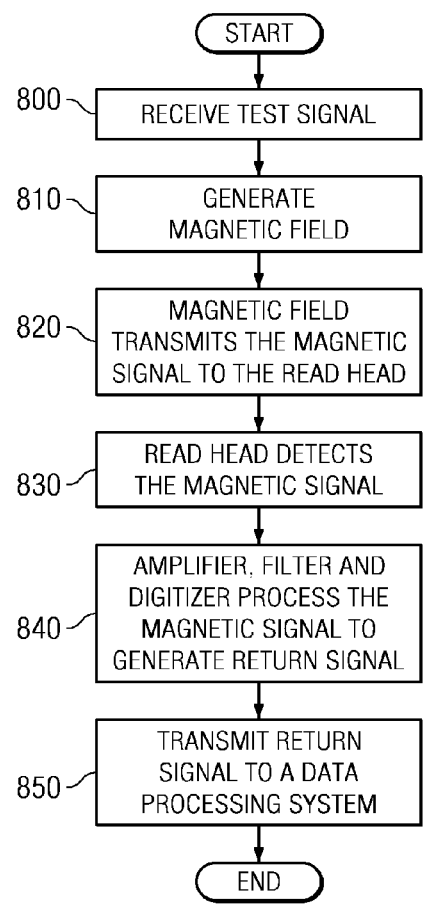

DIAGNOSING A MAGNETIC READER

BACKGROUND OF THE INVENTION

1. Field of the Invention

The present invention relates generally to an improved magnetic reader. More particularly, the present invention relates to a magnetic reader assembly, a magnetic reader subassembly, a computer implemented method, and a computer program product for diagnosing a magnetic reader subassembly.

2. Description of the Related Art

Magnetic readers are widely used in industry to read data encoded into a magnetic stripe disposed on the back of a plastic card or into characters printed on the bottom of a check. Magnetic readers are also used to sense the presence of a magnetic field. Three types of magnetic readers are the most commonly used: (1) a magnetic stripe reader that reads information encoded in a magnetic stripe disposed on one side of a card; 2) a magnetic ink character recognition (MICR) reader which reads information printed using a magnetized toner; and (3) Hall effect sensors which detect the presence of a magnetic field, usually from a permanent magnet.

Presently, magnetic readers do not include a mechanism to self-test or to perform a self-diagnosis. Current methods for testing the operability of a magnetic reader require the use of an external device. As a result, in order to determine whether the magnetic reader is functioning correctly, users are required to purchase several devices and then connect them together. Furthermore, users must store and locate the testing device each time a diagnosis is to be performed on the magnetic reader. Consequently, users frequently fail to perform any diagnostics on the magnetic readers, which ultimately results in undetected and un-repaired failures for unacceptably long periods of time.

BRIEF SUMMARY OF THE INVENTION

The illustrative embodiments provide a computer implemented method for diagnosing a magnetic reader subassembly. A processor generates a test signal during a diagnostic period. The processor then receives a return signal from the magnetic reader subassembly. The processor then compares the test signal and the return signal and diagnoses an operational status of the magnetic reader subassembly in response to the comparison of the test signal and the return signal.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a magnetic stripe reader, in accordance with an illustrative embodiment;

FIG. 4 illustrates a magnetic ink character recognition reader, in accordance with an illustrative embodiment;

FIG. 5 is a block diagram of a magnetic reader assembly, in accordance with an illustrative embodiment;

FIG. 6 is a table that illustrates the transformation of a signal through a magnetic reader assembly during a diagnostic period, in accordance with an illustrative embodiment;

FIG. 7 is a flowchart illustrating the process executed in a processor during a diagnostic period, in accordance with an illustrative embodiment; and FIG. 8 is a flowchart illustrating the process executed in a magnetic reader during a diagnostic period, in accordance with an illustrative embodiment.

DETAILED DESCRIPTION OF THE INVENTION

Figure 1:
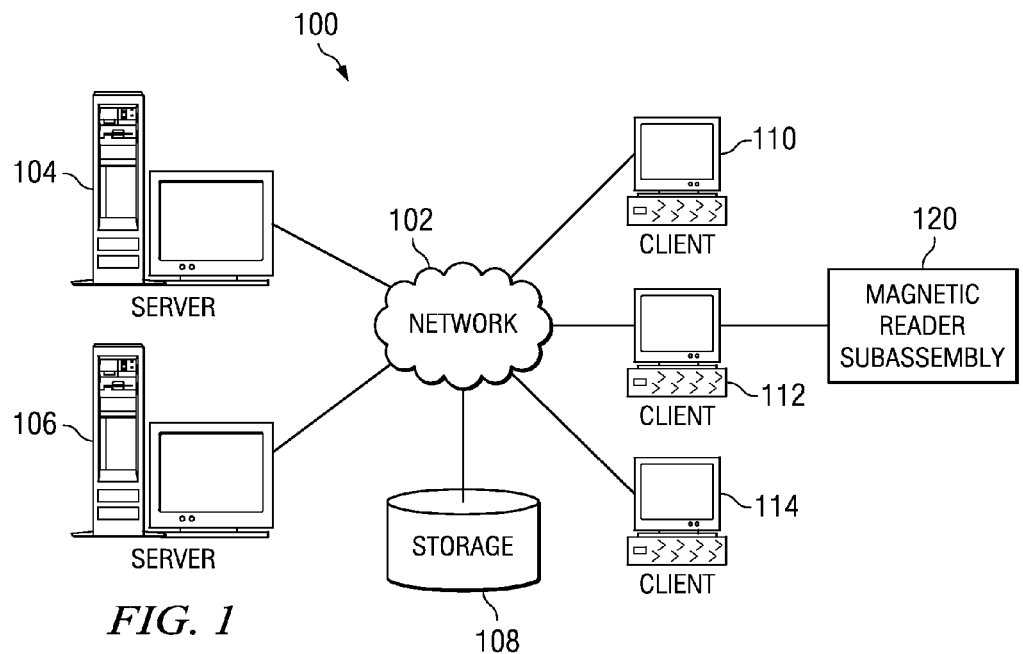
FIG. 1 illustrates a network of data processing systems, in which an illustrative embodiment may be implemented.
Figure 2:
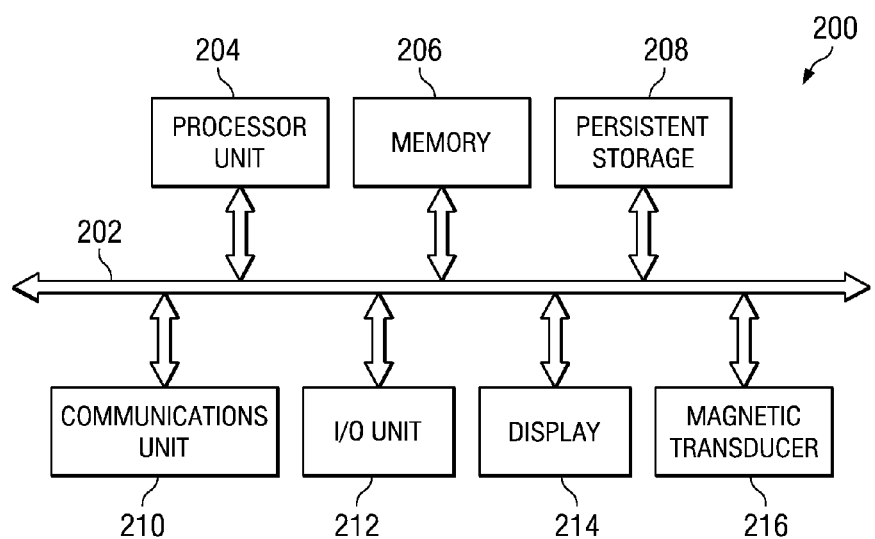
FIG. 2 is a block diagram of a magnetic reader assembly, in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Also, in the depicted example, magnetic reader subassembly 120 connects to client 112. Magnetic reader subassembly 120 is a data processing device that reads information or data using a magnetic field. Magnetic reader subassembly 120 may be, for example, a magnetic stripe reader, a magnetic ink character recognition (MICR) reader, or a Hall effect sensor. Magnetic reader subassembly 120 may also be internal or external to client 112. In the depicted example, magnetic reader subassembly 120 is external to client 112 and provides status information to clients 110 and 114 via client 112 regarding the operability of magnetic reader subassembly 120.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a magnetic reader assembly is depicted in accordance with an illustrative embodiment. In the illustrative embodiment, data processing system 200 can also be implemented as magnetic reader subassembly 120 of FIG. 1. In the illustrative embodiment, data processing system 200 includes communications fabric 202, which provides communications between processor unit 204, memory 206, persistent storage 208, communications unit 210, I/O unit 212, display 214, and magnetic transducer 216.

Processor unit 204 serves to execute instructions for software that may be loaded into memory 206. Processor unit 204 may be a set of one or more processors or may be a multi-processor core, depending on the particular implementation. Further processor unit 204 may be implemented using one or more heterogeneous processor systems in which a main processor is present with secondary processors on a single chip.

Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices, such as client 112 of FIG. 1. In these examples, communications unit 210 is a network interface card. I/O unit 212 allows for input and output of data with other devices that may be connected to data processing system 200. For example, I/O unit 212 may provide a connection for user input though a keyboard or mouse and output to a printer. Display 214 provides a mechanism to display information to a user.

Magnetic transducer 216 detects and generates a magnetic field. Magnetic transducer 216 uses the magnetic field to read information encoded in a magnetic stripe, such as a magnetic stripe located on a card, or information printed using a magnetic toner, such as the characters printed at the bottom of a check. In the illustrative embodiment, magnetic transducer 216 connects to communications fabric 202. However, in an alternative embodiment, magnetic transducer 216 can be a separate device connected to data processing system 200 through I/O unit 212.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

The illustrative embodiments provide a magnetic reader assembly, a magnetic reader subassembly, a computer implemented method, and a computer program product for diagnosing a magnetic reader subassembly. In one embodiment, the magnetic reader subassembly is a magnetic stripe reader that reads information encoded in a magnetic stripe disposed on one side of a card, such as a badge, hotel room card, or credit card. In another embodiment, the magnetic reader subassembly is a magnetic ink character recognition reader which reads information printed using a magnetized toner. An example of such information is the characters printed at the bottom of a check. In yet another embodiment, the magnetic reader subassembly is a Hall effect sensor which detects the presence of a magnetic field.

A diagnostic is a determination of whether a magnetic reader subassembly is operating correctly. During a diagnosing period, a processor generates a test signal. The signal is either a digital or an analog signal. The signal is used to drive a magnetic field generator that is physically near to or part of a magnetic head in the magnetic reader subassembly. The magnetic field generator can be a wire coil or another component shaped into a coil. The magnetic head in the magnetic reader subassembly then detects the magnetic field, enabling the magnetic reader subassembly to read the signal and data in the magnetic field. The magnetic reader subassembly then generates a return signal, and the processor compares the test and return signals. The processor also identifies an operational status of the magnetic reader subassembly in response to the comparison of the test and return signals. The operational status is the state or condition of the magnetic reader subassembly. The operational status is also the results or data from the diagnostic performed on the magnetic reader subassembly.

The operational status can be transmitted to a data processing system that is networked to the magnetic reader assembly. The operational status can also be communicated to a user in the form of at least one of a visual display, a printout, an audible sound, a systems management message, or a lockout feature. Examples of an operational status include, but are not limited to, "testing", "in need of repair", "operating normally", and data from last test. The data from the last test are the results generated from the last diagnostic performed on the magnetic reader assembly. An operational status can also include date, time, and identification of a magnetic reader assembly.

FIG. 3 illustrates a magnetic stripe reader, in accordance with an illustrative embodiment. Magnetic stripe reader 300 can be implemented as magnetic reader subassembly 120 of FIG. 1 and magnetic reader assembly 200 of FIG. 2. Magnetic stripe reader 300 is a data processing system that reads information encoded into a magnetic stripe disposed on one side of a card, such as a badge, hotel room card, or credit card. In the illustrative embodiment, magnetic stripe reader 300 reads information encoded into magnetic stripe 312 on card 310.

Magnetic stripe 312 is made from ferrous particles encased in a plastic film or plastic tape. Each particle in magnetic stripe 312 is approximately 20-millionths of an inch and acts like a tiny bar magnet. Magnetic stripe 312 is blank or contains no information when all the ferrous particles are polarized in the same direction. Information or data is written onto magnetic stripe 312 by polarizing the ferrous particles in a north pole or south pole direction. A magnetic flux, or a change in the magnetic field, is created when information is written onto magnetic stripe 312.

In the illustrative embodiment, magnetic stripe 312 includes three tracks designed to record information. However, in other embodiments, magnetic stripe 312 may include more or fewer tracks, thereby varying the amount of information that can be recorded on card 310. Additionally, in the illustrative embodiment, magnetic stripe 312 is disposed toward the bottom of magnetic card 310. However, in other embodiments, magnetic stripe 312 may be disposed anywhere along card 310, including at the top or center of card 310.

Moreover, in the illustrative embodiment, card 310 includes a single magnetic stripe 312. However, in another embodiment, card 310 may include a number of magnetic stripes 312 disposed on the back of card 310. The location, dimensions, and number of magnetic stripes 312 typically depends on the location, dimensions, and number of read heads in magnetic stripe reader 300.

In the illustrative embodiment, magnetic stripe reader 300 includes housing 320, slot 330, and display 340. Housing 320 is the outer structure of magnetic stripe reader 300. In an alternative embodiment, magnetic stripe reader 300 may exclude display 340. Housing 320 is made from any rigid material, such as a plastic resin, a metal alloy, or a combination of a plastic resin and metal alloy. In addition, housing 320 can be any shape, including but not limited to a square, rectangle, triangle, or circle. In the illustrative embodiment, housing 320 is a hollow rectangular solid made from a plastic resin.

Housing 320 includes slot 330. Slot 330 is an aperture in housing 320 that allows card 310 to slide through. In use, magnetic stripe reader 300 reads magnetic stripe 312 as a user slides card 310 through slot 330. When a user slides card 310 through slot 330, a read head in magnetic stripe reader 300 detects a magnetic flux or change in the polarity of the magnetic field. The change in polarity in the magnetic field indicates the nature of the information recorded in magnetic stripe 312. In other words, each piece of information in magnetic stripe 312 exhibits a specific polarity, a combination of polarities, or a sequence of polarities. Therefore, magnetic stripe reader 300 translates the information written onto magnetic stripe 312 by reading the polarities exhibited by the information in magnetic stripe 312.

In the illustrative embodiment, display 340 is a user interface that indicates the operational status of magnetic stripe reader 300. The operational status is the state or condition of magnetic stripe reader 300. The operation status is also the results or data from a diagnostic of magnetic stripe reader 300. For example, an operational status may be "testing", which indicates that magnetic stripe reader 300 is in a diagnostic period. A diagnostic period is the period of time when magnetic stripe reader 300 tests whether magnetic stripe reader 300 is operating correctly. Another example of an operational status may be "operating normally", which indicates that magnetic stripe reader 300 is operating as intended and is not in a diagnostic period. In a further example, an operational status may be "in need of repair", which indicates that one or more components in magnetic stripe reader 300 is not working properly. Therefore, the one or more components may require servicing or replacement. In one embodiment, magnetic stripe reader 300 may even communicate on display 340 which component is "in need of repair". Another example of an operational status may be the data from the last test, which includes the results from the last diagnostic performed on magnetic stripe reader 300. Magnetic stripe reader 300 communicates the data to another data processing system or to the user. The actual data or other information can also be presented when the operational status of data from the last test is displayed on display 340. Operational status can also include date, time, and identification of magnetic stripe reader 300. In the illustrative embodiment, display 340 states "TESTING ... PLEASE WAIT".

In the illustrative embodiment, display 340 is coupled directly to magnetic stripe reader 300, and the operational status is displayed directly on magnetic stripe reader 300. In an alternative embodiment, the operational status may be transmitted to a display remotely connected to magnetic stripe reader 300. In such an embodiment, display 340 is eliminated and is not included in magnetic stripe reader 300.

In another embodiment, display 340 communicates an error in magnetic stripe reader 300 that affects the operability of magnetic stripe reader 300. For example, display 340 may communicate whether magnetic stripe reader 300 failed to read the information on card 310 or whether the read head in magnetic stripe reader 300 is experiencing a signal failure. Display 340 may then instruct the user to swipe card 310 again.

In the illustrative embodiment, display 340 only communicates the operational status to a user. In another embodiment, display 340 may also include other features that allow a user to program other instructions into magnetic stripe reader 300, such as the duration and frequency of a diagnosis.

In the illustrative embodiment, display 340 is a screen connected to magnetic stripe reader 300. However, in another embodiment, display 340 may be any other type of visual indicator, such as a flashing or solid light emitting diode (LED). In another embodiment, an audio sound, such as an alarm, may be used instead of display 340. In yet another embodiment, magnetic stripe reader 300 may include a printer, instead of display 340, which prints out the operational status of magnetic stripe reader 300. In still yet another embodiment, magnetic stripe reader 300 may include a lock out feature, which disables the magnetic field detection circuits in magnetic stripe reader 300 and displays a "lock out status" on display 340. The lock out status prevents magnetic stripe reader 300 from reading any magnetic stripes, such as magnetic stripe 312. In still yet another embodiment, instead of display 340, magnetic stripe reader 300 may connect to and inform a host system of the status of magnetic stripe reader 300. The host system is any data processing system, such as client 112 of FIG. 1 or data processing system 200 of FIG. 2. The host system then notifies other networked data processing systems of the status of magnetic stripe reader 300 using a system management message. The operators of the networked data processing system are thus notified at a central location of the operational status of magnetic stripe reader 300 and other magnetic readers similar to magnetic stripe reader 300. The operator can then replace or repair magnetic stripe reader 300. Depending on the implementation, magnetic stripe reader 300 may include one or more of the embodiments described above.

Magnetic stripe reader 300 is not limited to the configuration depicted in the illustrative embodiment. For example, magnetic stripe reader 300 may include a number of slots similar to slot 330. Moreover, magnetic stripe reader 300 is not limited to a particular size. Furthermore, display 340 may be disposed along another edge of magnetic stripe reader 300 and display other communications to a user.

FIG. 4 illustrates a magnetic ink character recognition reader, in accordance with an illustrative embodiment. Magnetic ink character recognition (MICR) reader 400 can be implemented as magnetic reader subassembly 120 of FIG. 1 and magnetic reader assembly 200 of FIG. 2. Magnetic ink character recognition reader 400 is a device that reads information, such as the characters printed at the bottom of a check, which are printed using toner or ink that is or can be magnetized. In the illustrative embodiment, magnetic ink character recognition reader 400 reads characters 412 disposed along the bottom of check 410.

Characters 412 may be printed onto check 410 using standard printing techniques, such as offset printing, or may be printed via other techniques, such as by an inkjet printer. The toner used to print characters 412 includes small ferrous particles mixed into the ink of the toner. Typically, check 410 only includes a single row of characters 412. However, in another embodiment, check 410 may include any number of rows.

In the illustrative embodiment, magnetic ink character recognition reader 400 includes upper knob 420, lower knob 422, feeder 430, display 450, and slot 460. In an alternative embodiment, magnetic ink character recognition reader 400 may only include feeder 430 and slot 460, and may not include display 450, upper knob 420 and lower knob 422.

Upper knob 420 and lower knob 422 connect to a roller that adjusts and controls the rate at which check 410 feeds through magnetic ink character recognition reader 400. Upper knob 420 and lower knob 422 can be manually adjusted by a user, automatically controlled by a data processing system, or adjusted and controlled by both a user and a data processing system. In the illustrative embodiment, upper knob 420 and lower knob 422 are both adjusted and controlled by both a user and a data processing system.

Feeder 430 and slot 460 are apertures disposed along the sides of magnetic ink character recognition reader 400. Check 410 enters magnetic ink character recognition reader 400 through feeder 430 and exits through slot 460. Feeder 430 and slot 460 are dimensioned so that any check, such as check 410, can enter and exit magnetic ink character recognition reader 400.

Display 450 is a user interface that indicates the operational status of magnetic ink character recognition reader 400. Display 450 is similar to display 340 of FIG. 3. Display 450 may communicate information only or may include additional features that allow a user to program other instructions into magnetic ink character recognition reader 400. Display 450 may also communicate whether magnetic ink character recognition reader 400 has an error that affects the operability of magnetic ink character recognition reader 400. In the illustrative embodiment, display 450 is a screen connected to magnetic ink character recognition reader 400. In the illustrative embodiment, display 450 states "TESTING . . . PLEASE WAIT", which indicates that magnetic ink character recognition reader 400 is in a diagnostic period.

In use, when check 410 moves through magnetic ink character recognition reader 400, characters 412 pass over a magnet prior to passing under a read head (not shown) within magnetic ink character recognition reader 400. The magnet magnetizes the ferrous particles in characters 412. The read head in magnetic ink character recognition reader 400 then detects the magnetized ferrous parts of each character as characters 412 move past the read head. Different characters present different patterns of magnetized ferrous particles as the characters move past the read head. The different patterns enable magnetic ink character recognition reader 400 to read characters 412.

Magnetic ink character recognition reader 400 is not limited to the illustrative embodiment. For example, magnetic ink character recognition reader 400 may include more or fewer feeders and slots. Additionally, magnetic ink character recognition reader 400 may include a single aperture that allows check 410 to both enter and exit magnetic ink character recognition reader 400. Moreover, magnetic ink character recognition reader 400 may be any shape, such as a rectangle or square, and is not limited to a particular size. Furthermore, display 450 may be disposed along another edge of magnetic ink character recognition reader 400 and display other communications. In addition, display 450 may be embodied in a different form, such as another type of visual display, a printer, an audio sound, or a lock-out feature. Display 450 is not limited to one form and may include one or more forms.

FIG. 5 is a block diagram of a magnetic reader assembly, in accordance with an illustrative embodiment. Magnetic reader assembly 500 can be implemented as magnetic reader subassembly 120 of FIG. 1, magnetic reader assembly 200 of FIG. 2, magnetic stripe reader 300 of FIG. 3, or magnetic ink character recognition reader 400 of FIG. 4. Magnetic reader assembly 500 includes data processing system 510, magnetic transducer 520, and operational status 530.

Data processing system 510 can be implemented as data processing system 112 of FIG. 1. Data processing system 510 can also be implemented as magnetic reader assembly 200 of FIG. 2, except data processing system 510 would not include magnetic transducer 216 of FIG. 2. Data processing system 510 includes processor 512, amplifier 514, filter 516, and digitizer 518. Processor 512 can be similar to processor unit 204 of FIG. 2. Processor 512 executes the instructions for magnetic reader assembly 500 to perform a diagnosis. The diagnosis determines whether magnetic transducer 520 is operating correctly. Magnetic transducer 520 operates correctly when read head 524 accurately reads and generates information from a card, such as card 310 of FIG. 3, or from a check, such as check 410 of FIG. 4. Thus, in diagnostic use, processor 512 generates a test signal and transmits the signal to magnetic transducer 520. Magnetic transducer 520 reads the test signal and generates a return signal. If magnetic transducer 520 is operating correctly, the return signal should approximately match the test signal. If magnetic transducer 520 is not operating correctly, the return signal and the test signal will differ significantly.

Processor 512 executes the instructions to perform a diagnosis. During a diagnostic period, processor 512 generates and transmits a test signal that represents a test data sequence. Processor 512 can generate either an analog or a digital test signal. A signal is a flow of information or data generated from an electrical source. A signal is typically represented by either a sine or square wave. An analog signal is typically represented as a continuous sine wave or a combination of sine waves, while a digital signal, on the other hand, is typically represented by a square wave or a combination of square waves.

A series of pulses or waves in a signal represents a specific data sequence. A data sequence is a series of characters. Each character may be a number or a letter, and a data sequence typically is a combination of letters and numbers. In the illustrative embodiment, processor 512 generates a test signal which represents a data sequence similar to that which may be found in a magnetic stripe or in the characters at the bottom of a check.

The test signal has a unique pulse or wave pattern that may vary in amplitude and/or frequency. The spacing of each pulse or wave identifies the characters in the test data sequence. For example, the character "A" may have a very short space between each pulse while the character "Z" may have a very long space between each pulse. One of ordinary skill in the art would recognize that the illustrative example is used for demonstrative purposes only and does not accurately represent how a signal is actually represented and implemented.

Processor 512 generates either a digital test signal or an analog test signal to test magnetic transducer 520. In one embodiment, if processor 512 generates an analog test signal, the analog test signal is transmitted directly to magnetic transducer 520. In another embodiment, if processor 512 generates a digital test signal, the digital signal is transmitted to a digital-to-analog converter, which converts the digital test signal to an analog test signal. The converted signal is then transmitted to magnetic transducer 520.

Processor 512 transmits the test signal to magnetic transducer 520. Magnetic transducer 520 includes magnetic field generator 522 and read head 524. Magnetic field generator 522 generates magnetic field 525 that simulates the magnetic field created by the magnetic stripe on a card or the magnetic ink from a check. In other words, the generated magnetic field 525 simulates the magnetic field from ferrous particles found in the magnetic stripe or ink.

Magnetic field generator 522 can be a metal coil driven by processor 512 or another separate circuit. The metal coil can be made from a wire, comprising copper or some other material, or from any other conductive material shaped into a loop or coil.

In diagnostic use, processor 512 transmits a test signal to magnetic transducer 520 to generate magnetic field 525. The magnetic field 525 resulting from the test signal simulates the magnetic field from magnetic characters on a credit card, check or other magnetic media. The characters in the magnetic field are transmitted from magnetic field generator 522 to read head 524.

Magnetic field 525 encompasses read head 524 so that read head 524 can read the signal in the magnetic field. Read head 524 can consist of a coil, similar to magnetic field generator 522. Magnetic field 525 induces a current in the coil in read head 524. Read head 524 detects magnetic field 525 and the data sequence carried in the magnetic field signal by detecting the existence of a variation of magnetic field 525 exhibited by the characters in the data sequence. The variation of magnetic field 525 induces a variation in current in read head 524. The resulting current, referred to herein as the return signal, is fed into amplifier 514.

Amplifier 514 in data processing system 510 receives the return signal. Amplifier 514 is a device that increases the magnitude of an analog signal. When read head 524 transmits the return signal, the analog signal will also include noise. Noise is data or information without any meaning. In other words, noise is data that is not being used to transmit a signal but is essentially an unwanted by-product generated when a signal is processed by any device, such as read head 524 or amplifier 514. Visually, noise appears as a component of the signal itself, but, in application, noise often has a bandwidth greater than the signal.

In the illustrative embodiment, amplifier 514 increases the magnitude of each pulse or wave transmitted by read head 524. Generally, amplifier 514 magnifies waves differently for a particular frequency. Thus, in the illustrative embodiment, amplifier 514 would magnify the return signal by a different amount than much of the noise. For example, a desired return signal may have a frequency content or signal bandwidth of one to six kilohertz. The noise may have a frequency content or signal bandwidth of less than one kilohertz to more than six kilohertz. Note that, in certain circumstances, the noise bandwidth can be greater than the signal bandwidth. Thus, in the illustrative embodiment, amplifier 514 would magnify the return signal a large amount, while the noise outside of the signal bandwidth would be magnified a small amount.

Amplifier 514 transmits the amplified return signal and noise to filter 516. Filter 516 is a device that reduces unwanted signal components and may also improve wanted signal components. Filter 516 can be any mechanical or digital device, including but not limited to a piezoelectric filter, a passive filter, or a digital filter. In the illustrative embodiment, filter 516 is a combination of resistors and capacitors that removes much of the noise from the return signal by reducing the amplitude of signals outside of the signal bandwidth.

After reducing the noise, filter 516 transmits the resulting signal to digitizer 518. Digitizer 518 transforms the signal from an analog signal to a digital signal. An analog signal is a variable signal that is continuous in both time and amplitude. A digital signal, on the other hand, is a discrete time signal or a signal sampled over a specified period of time. A digital signal is often formed from an analog signal. To form the digital signal, digitizer 518 compares the amplitude of the analog signal to a threshold voltage. The threshold voltage can be empirically determined or can be set by a user at a point near the middle of the analog signal's expected voltage swing. The digital signal can also be formed using a circuit that adapts the threshold voltage to the analog signal and then compares the analog signal to the adapted threshold.

If the amplitude is greater than the threshold voltage, digitizer 518 creates an output of "1"; otherwise, digitizer 518 creates an output of "0". Digitizer 518 creates a sequential digital representation of the return signal, with the time the digital signal is a "1" representing the time that the analog signal is above the threshold. Likewise, the time the digital signal is a "0" represents the time that the analog signal is below the threshold. Digitizer 518 then transmits the digital signal to processor 512.

After processor 512 receives the digitized result signal, processor 512 executes a set of instructions to determine whether magnetic transducer 520 is operating correctly. In use, processor 512 compares the result signal against the test signal. In one embodiment, processor 512 compares the signals by converting the result signal from digitizer 518 into a data sequence and comparing the converted data sequence to the data sequence originally encoded and sent in the test signal. In another embodiment, processor 512 compares the signals directly by comparing the test signal sent to magnetic field generator 522 to the result signal received from read head 524. In this embodiment, the signals are compared on an analog basis and the return signal is not first digitized through digitizer 518.

If processor 512 determines that the test and result data sequences or signals match, then magnetic transducer 520 is operating correctly and can resume normal operations. If, on the other hand, processor 512 determines that the test and result data sequences or signals do not match, then magnetic transducer 520 or another component in magnetic reader assembly 500 is not operating correctly and has an error. In one embodiment, processor 512 may disable magnetic reader assembly 500 by enabling a locking feature. In another embodiment, processor 512 implements the locking feature by responding to requests for data with a message that magnetic reader assembly 500 is locked and cannot be unlocked until a command is received by a host system. In another embodiment, if the locking feature is already enabled as a result of magnetic reader assembly 500 performing the diagnostic process, then processor 512 can execute instructions to maintain the locking feature.

During the diagnostic process, data processing system 510 generates operational status 530. Operational status 530 communicates the operational status of magnetic reader assembly 500. In one embodiment, operational status 530 may be implemented as a message displayed on a user interface, such as display 340 of FIG. 3 or display 450 of FIG. 4. In another embodiment, operational status 530 may be implemented as a signal that triggers an indicator. The indicator may be another type of visual indicator, such as a light emitting diode (LED) or an audio alarm. In yet another embodiment, operational status 530 may be transmitted to a remote data processing system via a network, such as clients 110 and 114 via network 102 of FIG. 1. The network can be wired or wireless. In yet another embodiment, magnetic reader assembly 500 can be connected to a host system. The host system is another data processing system and may also include an antenna or other type of transmitter that communicates operational status 530. With the transmitter, magnetic reader assembly 500 can communicate the operational status of magnetic reader assembly 500 to another networked data processing system. Furthermore, in another embodiment, operational status 530 may be stored using a storage device, such as memory 206 or persistent storage 208 of FIG. 2. In the storage device, operational status 530 is stored, and any errors in magnetic reader assembly 500 are stored in the storage device.

In another embodiment, processor 512 can vary the amplitude of the test signal in order to determine the minimum amplitude that results in a successful diagnostic. Processor 512 can save the minimum amplitude could be in a storage device or communicate the minimum amplitude to a systems management device for storage and utilization. If a future test requires a larger minimum amplitude test signal for success, processor 512 can conclude and display an operational status that the performance of magnetic reader assembly 500 has degraded but is still in working condition. The operational status could be used to initiate preventative maintenance on magnetic reader assembly 500. The minimum successful test signal amplitude can also be included in the operational status reported as a result of the test.

Magnetic reader assembly 500 is not limited to the illustrative embodiment. For example, in another embodiment, magnetic reader assembly 500 may not include data processing system 510. For example, in another embodiment, magnetic reader assembly 500 may be a subassembly that only includes magnetic transducer 520 and processor 512. In another example, magnetic reader assembly 500 may include more or fewer components. Moreover, in another embodiment, magnetic reader assembly 500 can be implemented in a device that includes a Hall effect sensor. Hall effect sensors are transducers which sense changes in the density of a magnetic field. Typically, Hall effect sensors are used for proximity switching, positioning, and speed detection. Typically, Hall effect sensors are combined with an integrated circuit and allow a device to act like a switch, or in an "on" or "off" mode. For example, a Hall effect sensor can be implemented in a point-of-sale (POS) device to detect the position of a key. The Hall effect sensor detects a magnetic field generated by a permanent magnet connected to a lock cylinder. When a key turns the cylinder, the permanent magnet is moved close to the Hall effect sensor. The generated magnetic field in the presence of the Hall effect sensor indicates that the key is in the "on" position, while the non-existence of the magnetic field indicates that the key is in the "off" position.

Hall effect sensors typically read only a single bit of information. In other words, Hall effect sensors usually only detect a single "0" or a single "1" instead of a string of "0s" and "1s". Thus, Hall effect sensors only perceive if a magnetic field exists, or a "1" bit of information, or if a magnetic field does not exist, or a "0" bit of information.

In the illustrative embodiment, read head 524 can be a Hall effect sensor. Thus, in use, processor 512 generates a test signal that represents a single bit of information. The test signal could be a constant, direct current (DC) signal. Magnetic field generator 522 generates a magnetic field and transmits the information to the Hall effect sensor, or read head 524. Read head 524 detects the magnetic signal and processes the information. Read head 524 then generates a return signal and transmits the return signal to amplifier 514. Hall effect sensors are typically combined with an integrated circuit chip and other circuits, such as an amplifier, filter, and digitizer, to provide a digital output when a magnetic field is sensed. Thus, in the illustrative embodiment, amplifier 514 then magnifies the return signal and the noise in the return signal. Filter 516 reduces the amount of noise in the return signal and then sends the return signal to digitizer 518. Digitizer 518 converts the return signal back to a digital signal and transmits the digitized return signal to processor 512. Processor 512 then compares the return signal with the test signal to determine whether the Hall effect sensor is working properly.

FIG. 6 is a table that illustrates the transformation of a signal through a magnetic reader assembly during a diagnostic period, in accordance with an illustrative embodiment. Table 600 is exhibited in a magnetic reader assembly, similar to magnetic reader assembly 500 of FIG. 5.

Table 600 includes component column 610 and generated signal column 620. Component column 610 lists a particular component in a magnetic reader. Generated signal column 620 illustrates the signal that results from the corresponding component listed in component column 610.

In the illustrative embodiment, during a diagnostic period, processor 630 generates signal 635. Signal 635 is a digital signal and represents a test data sequence. Signal 635 may be a square wave or a combination of pulses of varying width. In an alternate embodiment, processor 630 may initially generate an analog signal by using a digital-to-analog converter. Processor 630 would then transmit a digital signal to a digital-to-analog converter. The digital-to-analog converter would generate an analog signal wave, similar to signal 655.

Processor 630 then transmits signal 635 to magnetic field generator 640. Magnetic field generator 640 then creates magnetic field signal 645, which is proportional to signal 635. In the illustrative embodiment, magnetic field signal 645 is a square wave. But, in another embodiment, depending on the frequency response of magnetic field generator 640, magnetic field signal 645 may be a different shape and may not be a square wave.

Magnetic field generator 640 transmits magnetic field signal 645 to read head 650. Magnetic field signal 645 induces signal 655 in read head 650, which forms a return data sequence. The return data sequence is an analog signal represented as signal 655. In the process of detecting magnetic field signal 645, noise is generated or received by read head 650. The noise is included in signal 655.

Read head 650 then sends signal 655 to amplifier 660. Amplifier 660 magnifies parts of signal 655 that are within the predefined signal bandwidth to help reduce the noise in signal 655. Because signal 655 and the noise have different bandwidths, amplifier 660 magnifies the return signal and the noise in signal 655 by varying amounts. Therefore, in the illustrative embodiment, amplifier 660 generates signal 665, which is similar to signal 655 but includes less noise.

Amplifier 660 then transmits signal 665 to filter 670. Filter 670 further removes noise from signal 665. The noise is not completely eliminated but is reduced as compared to signal 665. Filter 670 generates signal 675 and then transmits signal 675 to digitizer 680. Digitizer 680 converts signal 675 from an analog signal to a digital signal by comparing analog signal 675 to voltage threshold 682. Digitizer 680 forms signal 685, which is a square wave or a digital signal with the signal at "1" when analog signal 675 is above voltage threshold 682 and at "0" when analog signal 675 is below voltage threshold 682. The length of time signal 685 is at 1 or 0 depends on the respective length of time that signal 675 is above or below voltage threshold 682. Digitizer 680 then transmits signal 685 to processor 630. Next, processor 630 compares signal 635 against signal 685. If signal 635 and signal 685 match within predetermined variances, then the magnetic reader is operating correctly.

As mentioned above, Hall effect sensors are commonly combined with an integrated circuit chip and other circuits such as an amplifier, filter, and digitizer to provide a digital output when a magnetic field is sensed. Thus, in the illustrative embodiment, signals similar to signals 655, 665, and 675 are generated within the integrated circuit and are typically not easily observable.

FIG. 7 is a flowchart illustrating the process executed in a processor during a diagnostic period, in accordance with an illustrative embodiment. The following process is exemplary only and the order of the steps may be interchanged without deviating from the scope of the invention. The process is executed in a processor, similar to processor 512 of FIG. 5 and processor 630 of FIG. 6. The process may also be executed in a magnetic reader assembly, such as magnetic reader assembly 500 of FIG. 5, if the magnetic reader assembly includes a data processing system, such as data processing system 510 of FIG. 5.

The process begins with the processor generating a test signal (step 700). The processor then receives a return signal from a magnetic reader assembly (step 710). The return signal is generated by the magnetic reader assembly as a result of processing the test data sequence. The processor then compares the test signal against the return signal (step 720). The processor then determines whether the magnetic reader assembly is operating correctly (step 730). If the test and return signals match within predetermined variances ("yes" output to step 730), then the magnetic reader assembly continues normal operation (step 740), with the process terminating thereafter.

Returning to step 730, if the test and return signals do not match within predetermined variances ("no" output to step 730), the magnetic reader assembly is disabled (step 750). The processor then optionally notifies a networked data processing system that the magnetic reader assembly is disabled (step 760). The processor then also optionally notifies the user of the operational status of the magnetic reader assembly (step 770), with the process terminating thereafter.

FIG. 8 is a flowchart illustrating the process executed in a magnetic reader assembly during a diagnostic period, in accordance with an illustrative embodiment. The following process is exemplary only and the order of the steps may be interchanged without deviating from the scope of the invention. The process is executed in a magnetic reader assembly similar to magnetic reader assembly 500 of FIG. 5.

The process begins with the magnetic transducer receiving a test signal from a processor (step 800). The magnetic transducer then generates a magnetic field (step 810) to form a magnetic signal. The magnetic field then transmits the magnetic signal to the read head (step 820). The read head then detects the magnetic signal (step 830). The amplifier, filter and digitizer process the magnetic signal to generate a return signal (step 840). The return signal is then transmitted to a data processing system (step 850). The process terminates thereafter.

Thus, the illustrative embodiments provide a magnetic reader assembly, a magnetic reader subassembly, a computer implemented method, and a computer program product for diagnosing a magnetic reader subassembly. In one embodiment, the magnetic reader subassembly is a magnetic stripe reader that reads information encoded in a magnetic stripe disposed on one side of a card, such as a badge, hotel room card, or credit card. In another embodiment, the magnetic reader subassembly is a magnetic ink character recognition reader which reads information printed using a magnetized toner. An example of such information is the characters printed at the bottom of a check. In yet another embodiment, the magnetic reader subassembly is a Hall effect sensor which detects the presence of a magnetic field.

A diagnostic is a determination of whether a magnetic reader subassembly is operating correctly. During a diagnosing period, a processor generates a test signal. The signal is either a digital or an analog signal. The signal is used to drive a magnetic field generator that is physically near to or part of a magnetic head in the magnetic reader subassembly. The magnetic field generator can be a wire coil or another component shaped into a coil. The magnetic head in the magnetic reader subassembly then detects the magnetic field, enabling the magnetic reader subassembly to read the signal and data in the magnetic field. The magnetic reader subassembly then generates a return signal, and the processor compares the test and return signals. The processor also identifies an operational status of the magnetic reader subassembly in response to the comparison of the test and return signals. The operational status is the state or condition of the magnetic reader subassembly. The operational status is also the results or data from the diagnostic performed on the magnetic reader subassembly.

The operational status can be transmitted to a data processing system that is networked to the magnetic reader assembly. The operational status can also be communicated to a user in the form of at least one of a visual display, a printout, an audible sound, a systems management message, or a lockout feature. Examples of an operational status include, but are not limited to, "testing", "in need of repair", "operating normally", and data from last test. An operational status can also include date, time, and identification of a magnetic reader assembly.

The illustrative embodiments allow a user to determine whether a magnetic reader is operating correctly. The illustrative embodiments allow a magnetic reader to perform a self-diagnosis in place of utilizing an external device to determine the operational status of the magnetic reader. The illustrative embodiments also provide a user with a mechanism for determining the type of error that exists in the magnetic reader. Furthermore, the illustrative embodiments allow for a data processing system that is networked to the magnetic reader to be informed of the operational status of the magnetic reader. In this manner, the data processing system can track and determine whether a business entity needs to replace or repair a particular magnetic reader.

The invention can take the form of an entirely hardware embodiment or an embodiment containing both hardware and software elements. In a preferred embodiment, part of the invention is implemented in software, which includes but is not limited to firmware, resident software, microcode, etc.

Furthermore, part of the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for diagnosing a magnetic reader subassembly inside a reader housing, the method comprising:
generating a test signal at a processor during a diagnostic period;
transmitting the test signal to a magnetic transducer in the magnetic reader subassembly, wherein the magnetic transducer generates a magnetic field from the test signal to form a magnetic signal that represents the test signal and reads the magnetic signal of the generated magnetic field to form a return signal;
receiving the return signal from the magnetic reader subassembly;
comparing the test signal and the received return signal to form a comparison;
and responsive to the comparison, identifying an operational status of the magnetic reader subassembly.

2. The method of claim 1, further comprising:
transmitting the operational status of the magnetic reader subassembly to a data processing system in communication with the magnetic reader subassembly.

3. The method of claim 1, further comprising:
communicating the operational status to a user in a form of at least one of a visual display, a printout, an audible sound, a systems management message, and a lockout feature.

4. The method of claim 1, wherein the operational status is one of "testing", "in need of repair", "operating normally", and data from last test.

5. The method of claim 4, wherein the operational status comprises a date, a time, and an identification of the magnetic reader subassembly.

6. The method of claim 4, wherein the operational status is communicated to a central location.

7. The method of claim 1, wherein the magnetic reader subassembly comprises a magnetic stripe reader, or a magnetic ink character recognition reader.

8. The method of claim 1, wherein the test signal is one of a digital signal and an analog signal.

9. The method of claim 1, wherein the test signal represents a test data sequence, wherein the test data sequence is carried in the magnetic field to form the magnetic signal, and wherein reading the magnetic signal comprises a read head of the magnetic transducer detecting the magnetic signal to form the return signal.

10. The method of claim 9, and further comprising amplifying, filtering and digitizing the detected magnetic signal to form the return signal.

11. The method of claim 1, wherein the magnetic transducer generates a magnetic field that simulates a magnetic field from ferrous particles found in a magnetic stripe on a card or magnetic ink to form a magnetic signal that represents the test signal.

12. A magnetic reader assembly inside a reader housing, comprising:
a magnetic transducer in a magnetic reader subassembly, wherein the magnetic transducer receives a test signal at a processor during a diagnostic period, generates a magnetic field from the test signal to form a magnetic signal, and reads the magnetic signal of the generated magnetic field to generate a return signal in response to processing the test signal;
and a processor coupled to the magnetic reader subassembly and adapted to generate the test signal during a diagnostic period, to receive the return signal from the magnetic reader subassembly, and to compare the test signal and the return signal to identify an operational status of the magnetic reader subassembly.

13. The magnetic reader assembly of claim 12, wherein the magnetic transducer further comprises:
a magnetic field generator that generates a magnetic field representative of the test signal to form a magnetic signal; and
a read head coupled to the magnetic field generator that detects the magnetic signal and generates the return signal.

14. The magnetic reader assembly of claim 13, wherein the magnetic field generator generates a magnetic field that simulates a magnetic field from ferrous particles found in a magnetic stripe on a card or magnetic ink and that is representative of the test signal to form the magnetic signal.

15. The magnetic reader assembly of claim 12, wherein the magnetic reader assembly communicates the operational status to a user in a form of at least one of a visual display, a printout, an audible sound, a systems management message, and a lockout feature.

16. The magnetic reader assembly of claim 12, wherein the operational status is one of "testing", "in need of repair", "operating normally", and data from last test.

17. The magnetic reader assembly of claim 12, wherein the operational status is communicated to a central location.

18. A computer program product comprising a computer usable medium including computer usable program code for self-diagnosing a magnetic reader subassembly inside a reader housing, said computer program product comprising:
computer usable program code for generating a test signal at a processor during a diagnostic period;
computer usable program code for directing the test signal from the processor to the magnetic reader subassembly, wherein the magnetic transducer generates a magnetic field from the test signal to form a magnetic signal that represents the test signal and reads the magnetic signal of the generated magnetic field to form a return signal;
computer usable program code for receiving the return signal from the magnetic reader subassembly in response to the test signal;
computer usable program code for comparing the test signal and the return signal; and computer usable program code for identifying an operational status of the magnetic reader subassembly responsive to the comparison of the test signal and the return signal.

19. The computer program product of claim 18, further comprising:

computer usable program code for transmitting the operational status of the magnetic reader subassembly to a data processing system in communication with the magnetic reader subassembly.

20. The computer program product of claim 18, further comprising:

computer usable program code for communicating the operational status to a user in a form of at least one of a visual display, a printout, an audible sound, a systems management message, and a lockout feature.

* * * * *